(No Model.)
E. A. QUISENBERRY.
MANUFACTURE OF ICE.
No. 460,029. Patented Sept. 22, 1891.
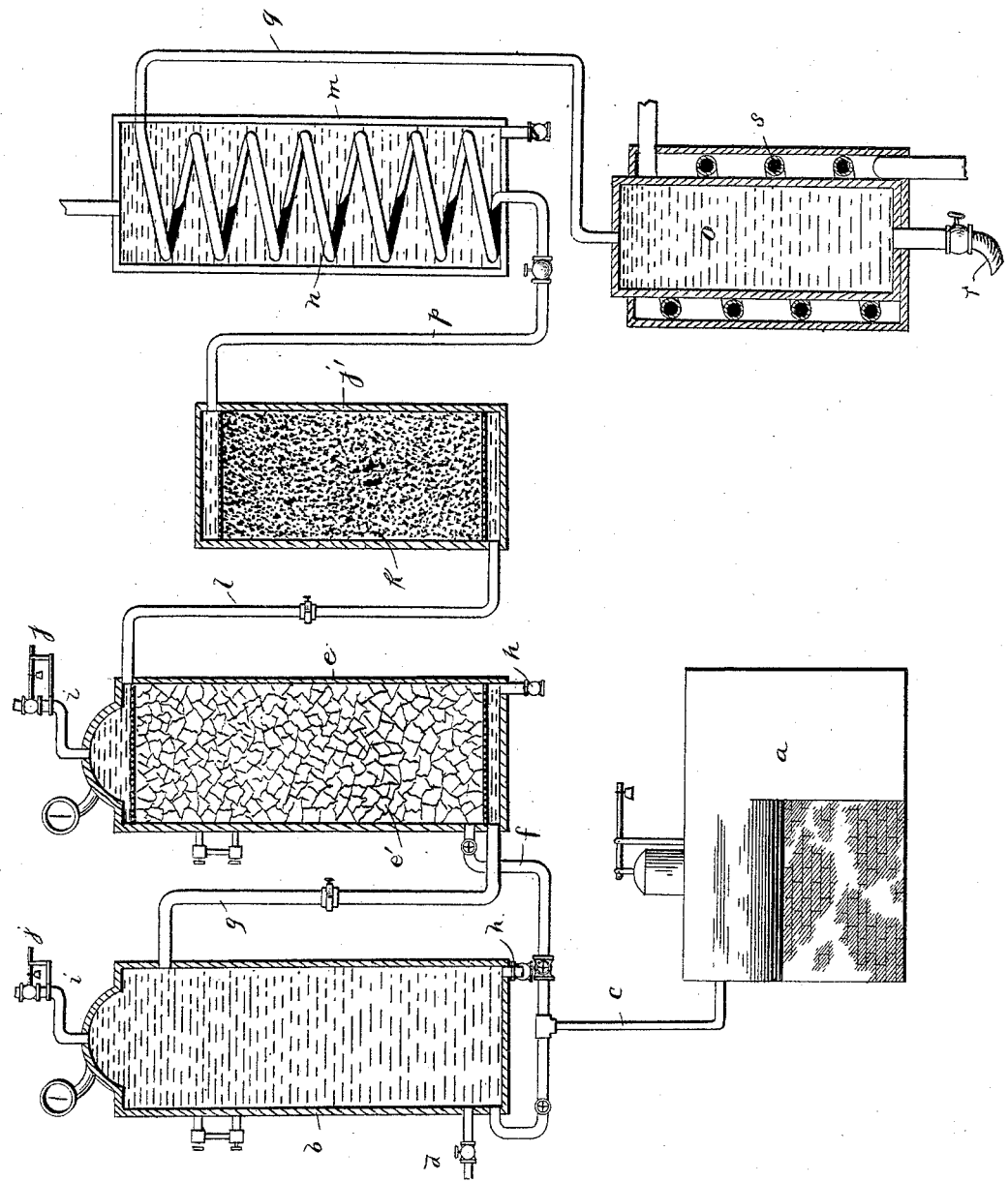
Witnesses:
E. C. Duffy
H. E. Peck
Inventor
E. A. Quisenberry
per C. E. Duffy
Attorney

UNITED STATES PATENT OFFICE.

EDWARD A. QUISENBERRY, OF LEXINGTON, VIRGINIA.

MANUFACTURE OF ICE.

SPECIFICATION forming part of Letters Patent No. 460,029, dated September 22, 1891.

Application filed September 6, 1890. Serial No. 364,113. (No model.)

*To all whom it may concern:*

Be it known that I, EDWARD A. QUISENBERRY, of Lexington, in the county of Rockbridge and State of Virginia, have invented certain new and useful Improvements in De-aerating and Purifying Water for the Manufacture of Ice; and I do hereby declare that the following is a full, clear, and exact description of the invention, which will enable others skilled in the art to which it appertains to make and use the same, reference being had to the accompanying drawing, and to the letters of reference marked thereon, which forms part of this specification.

This invention relates to certain improvements in the manufacture of ice.

The object of the invention is to improve the invention shown and described and set forth in my pending application, Serial No. 352,470, filed May 20, 1890, whereby the water to be frozen is thoroughly purified and the air, lime, and all impurities removed therefrom.

This object is accomplished by and this invention consists in certain novel features of construction and in combinations of parts and in certain methods, more fully described hereinafter, and particularly pointed out in the claims.

Referring to the accompanying drawing, which illustrates a sectional elevation of a portion of the apparatus, $a$ indicates a suitable generator or source of steam-supply.

$b$ is a closed upright boiler or tank strongly constructed to withstand considerable outward pressure, say twenty to one hundred pounds per square inch.

$c$ is a steam-supply pipe from the generator into the lower portion of the boiler. $d$ is a water-supply pipe into said tank or boiler, preferably between its ends.

$e$ is a filtering-tank, preferably constructed similar to boiler $b$ and completely filled with any suitable filtering material $e'$, such as lump coke. This filter also has a steam-supply pipe $f$ from the generator discharging into its bottom, and a water-pipe $g$ extends from the upper portion (a short distance below the top thereof) of the boiler into a space in the bottom of the filter beneath a screen supporting the filtering material.

The boiler and filter-tanks are provided with blow-off discharge-pipes $h\ h$ from their bottoms, provided with valves, as shown. The tops of said two tanks are preferably dome-shaped and provided with blow-off pipes $i\ i$ from the top thereof. These blow-offs $i$ are each provided with an automatic safety-valve $j$, set to a certain predetermined pressure. These two tanks are also provided with suitable pressure-indicators and water-gages. $j'$ is another filter-tank filled with suitable filtering material $k$, finer than that in filter $e$. A pipe $l$ extends from the upper portion of steam-filter tank $e$ into the lower portion of auxiliary filter $j$. This auxiliary filter is not supplied with steam.

$m$ is the cooling-chamber, through which cool water is kept circulating. $n$ is a cooling-coil therein connected at one end by a pipe $p$ with the top of the auxiliary filter and at its upper end by a pipe $q$ with the cooled supply-reservoir $o$, provided with the valved discharge-pipe $r$ from its lower end, through which the ice-cans are filled. This supply-reservoir is kept cold by an ammonia-coil $s$, surrounding the same and supplied with spent gas from the freezing-tank, (not here shown,) as fully set forth in said prior application.

The method is carried out as follows: The boiler is completely filled to the top of the dome through supply-pipe $d$ with the water to be kept frozen. A stream of steam is then passed into the confined body of water in the boiler through the steam-supply pipe, thereby causing the steam to completely permeate throughout the water and raise the temperature of the same to a high degree. By this means the air and gases are liberated from the water and also a great portion of all solid impurities. When the pressure in the boiler reaches a certain predetermined degree, the safety-valve $j$ is forced open and a quantity of water in the dome of the boiler and the collection of liberated air and gas are blown out through blow-off pipe $i$. At desired periods a suitable quantity of water from the bottom of the boiler can be blown out through pipe $h$, thereby carrying out all the impurities settled in the bottom of the boiler. The water, after being treated in the boiler for a suitable period, is passed from upper portion of boiler through pipe $g$ into lower portion of filter, wherein a stream of steam is passed, thereby further liberating the air and gases held in the water and also liberating impurities—such as lime, &c.—which are caught and held by the filtering material. The impurities and a portion of the water carrying the same are blown from the filter in the same manner as from the boiler. The water after being sufficiently treated in the steam-filter is passed through the auxiliary filter, which removes all remaining suspended particles therein, and from the purified and deaerated water is cooled by passing through the cooling-coil, and from thence is passed into the supply-reservoir, where it is kept cool, and from which the ice-cans are filled, as required. These cans are filled by placing the end of the discharge-pipe in the bottom of the can and thus allowing them to fill without mixing the water with air.

The primary object of this invention is to remove all air and suspended gases and impurities and lime, &c., from the water. In the presence of live steam water most freely liberates these impurities which are held by the filtering material. The invention is very effective in removing the lime or other minerals from hard water. Considerably more water should be fed into the boiler than it is desired to feed into the cans to make allowance for the water wasted or blown off from the boiler and steam-filter with the impurities.

Ice made by this machine and method is of the highest and best quality.

What I claim is—

1. The method of purifying and deaerating water for the manufacture of ice, which consists in forcing a stream of steam into a body of water confined in a closed boiler, discharging part of the water containing impurities from opposite ends of said boiler, passing the water from said boiler and discharging a stream of live steam into said water while confined and in the presence of filtering material, and then cooling the water and discharging the same into a supply-vessel in a purified and deaerated condition for freezing, substantially as described.

2. The method of purifying and deaerating water for the manufacture of ice, which consists in treating a confined body of water in a closed boiler with live steam, blowing off the impurities from opposite ends of the boiler, passing the water from said boiler and treating the same in a closed tank with live steam in the presence of filtering material, blowing off a portion of said water from opposite ends of said tank, and passing the water from said steam-filter through finer filtering material, and then cooling the water.

3. The combination of the boiler having a water-supply and valved blow-off pipes from its opposite ends and the steam-supply thereinto, the filter-tank containing filtering material and connected with said boiler, having a water-outlet, and a steam inlet and discharges from its opposite ends, substantially as described.

4. The filter-tank consisting of a closed tank having valved blow-off pipes from its opposite ends and containing filtering material and having a water-inlet and a water-outlet between its ends, and a steam-pipe opening into said tank and connected with a steam-supply, substantially as described.

5. In an apparatus for the purpose set forth, the combination of a steam-generator, the closed boiler having a water-supply pipe and a steam-pipe thereinto from said generator, the closed steam-filter tank connected with said generator and having blow-offs from its ends, the cooling-tank, the supply-reservoir, a pipe from said boiler between its ends into said filter, and a discharge from said filter through the cooling-tank to said reservoir, substantially as set forth.

6. In an apparatus for the purposes set forth, the combination of a closed boiler having a water-supply, valved blow-off pipes from top and bottom of said boiler, a cooling-tank, and a closed cooled deaerated-water-supply vessel provided with a valved discharge or conduit through which the water passes out of contact with the air from said boiler at a point between and a distance from its ends through said cooling-tank into said vessel, as set forth.

7. The mode of purifying and deaerating water for the manufacture of ice, which consists in completely filling a tank with the water to be frozen in the presence of filtering material, discharging a stream of live steam into said confined body of water in the presence of the filtering material, discharging portions of the water containing air and impurities from opposite ends of the tank, and drawing off the purified water from the tank between its ends, substantially as described.

In testimony that I claim the foregoing as my own I affix my signature in presence of two witnesses.

EDWARD A. QUISENBERRY.

Witnesses:
   H. E. PECK,
   C. M. WERLÉ.